Patented May 12, 1931

1,804,429

UNITED STATES PATENT OFFICE

WALTER NODDACK AND IDA NODDACK, OF BERLIN-GRUNEWALD, GERMANY, ASSIGNORS TO SIEMENS & HALSKE, AKTIENGESELLSCHAFT, OF SIEMENSSTADT, NEAR BERLIN, GERMANY, A CORPORATION OF GERMANY

PRODUCTION OF CONCENTRATES OF RHENIUM

No Drawing. Application filed March 13, 1929, Serial No. 346,765, and in Germany November 22, 1928.

Our invention relates to improvements in the production of concentrates of rhenium.

To obtain from rhenium containing minerals a product which has a higher content or increased strength of rhenium, the raw product is according to our improved process dissolved and this solution is treated with sulphuretted hydrogen. The rhenium with a portion of the other metallic constituents of the raw material is then precipitated as sulphide. As raw material any of the rhenium containing minerals, such as columbite, gadolinite may be used. The pyrrhotites (magnetic pyrites) also contain rhenium. Molybdenum glance, which also contains rhenium, is less suitable for carrying out the process, because during the treatment with sulphuretted hydrogen the molybdenum as well as the rhenium is precipitated.

Preferred solvents are hydrochloric acid and sulphuric acid.

A preferred process is carried out as follows:

1000 kg. pyrrhotites are reduced and dissolved in the necessary quantity of hydrochloric acid. The metal content in solution is composed of approximately 70% iron, 20% nickel, 9% cobalt, 0.5% arsenic, 0.2% molybdenum, 0.2% tungsten, 0.1% vanadium, and 0.0001% rhenium. The solution is treated with sulphuretted hydrogen, whereby a precipitate of about 5 kg. sulphides is obtained. In solution remain all the iron, nickel, cobalt, tungsten and vanadium. The precipitate contains the arsenic, molybdenum and rhenium. In this precipitate the rhenium is thus concentrated to about 200 times the amount of the raw material. In the 5 kg. precipitate there is contained approximately 1 gr. rhenium.

The sulphide precipitate may now be subjected to any further treatment, for instance in such a manner that the precipitated sulphides are dissolved in nitric acid and precipitated with ammonium nitrate and phosphoric acid or a phosphate. Preferably this precipitation is repeated several times until a substantial concentration of the rhenium has taken place. The further treatment preferably takes place according to the process of fractional sublimation.

If instead of magnetic pyrites or pyrrhotites a raw material is employed which contains the metals combined with earth (metallic oxides) acid, such as columbite, the combinations of the earth acid will first be separated as combinations soluble with difficulty prior to preparing the solution. This may, for instance, be effected by melting or fusing columbite together with bisulphate of potassium, dissolving the melt in water, and separating the niobite acid remaining behind undissolved. The solution then contains iron, nickel, cobalt, arsenic, molybdenum and rhenium. The acid solution is now treated with sulphuretted hydrogen in the manner described above.

Various modifications and changes may be made without departing from the spirit and the scope of the invention, and we desire, therefore, that only such limitations shall be placed thereon as are imposed by the prior art.

We claim as our invention:

1. The process of producing concentrates of rhenium, which consists in directly dissolving rhenium containing raw materials and precipitating the rhenium from the solution as sulphide.

2. The process of producing concentrates of rhenium from raw materials, which contain combinations of the earth acid, which consists in dissolving the raw materials, separating the earth acid as combinations soluble with difficulty, and following this up by precipitating the rhenium and other metallic constituents of the raw material from the solution as sulphides.

In testimony whereof we affix our signatures.

WALTER NODDACK.
IDA NODDACK.